US007059080B2

(12) United States Patent  (10) Patent No.: US 7,059,080 B2
Bendel                              (45) Date of Patent: Jun. 13, 2006

(54) FISHING LURE SYSTEM

(76) Inventor: Bruce N. Bendel, 3891 W. 62nd St., Excelsior, MN (US) 55331

( * ) Notice: Subject to any disclaimer, the term of this patent is extended or adjusted under 35 U.S.C. 154(b) by 0 days.

(21) Appl. No.: 10/927,913

(22) Filed: Aug. 27, 2004

(65) Prior Publication Data

US 2006/0042148 A1    Mar. 2, 2006

(51) Int. Cl.
 *A01K 85/00*    (2006.01)
(52) U.S. Cl. .................. 43/42.15; 43/42.49; 43/42.11; 43/42.36; 43/42.48
(58) Field of Classification Search ............... 43/42.15, 43/42.11, 43.15, 42.24, 42.36, 42.49, 42.45, 43/42.47, 42.48
See application file for complete search history.

(56) References Cited

U.S. PATENT DOCUMENTS

| 643,579   | A | * | 2/1900  | Votaw et al. ............... 43/42.24 |
| 963,860   | A | * | 7/1910  | Byrom ....................... 42/42.11 |
| 1,611,644 | A |   | 12/1926 | Johnson |
| 1,657,966 | A | * | 1/1928  | Jordan ........................ 43/42.49 |
| 1,897,107 | A | * | 2/1933  | Bobo ......................... 43/42.49 |
| 2,115,302 | A | * | 4/1938  | Chochard ................. 43/42.48 |
| 2,217,789 | A | * | 10/1940 | Bobo ......................... 43/42.49 |
| 2,228,591 | A | * | 1/1941  | Brown ....................... 43/42.36 |
| 2,233,684 | A | * | 3/1941  | Strite ........................ 43/42.15 |
| 2,237,077 | A | * | 3/1941  | Hayley, Jr. ................ 43/42.48 |
| 2,238,832 | A | * | 4/1941  | Thoren ..................... 43/42.15 |
| 2,413,371 | A | * | 12/1946 | Wellesley ................. 43/43.11 |
| 2,456,254 | A | * | 12/1948 | Paul ............................ 43/43.15 |
| 2,503,369 | A | * | 4/1950  | Wycech ..................... 43/42.49 |
| 2,503,529 | A | * | 4/1950  | Wardrip ..................... 43/42.15 |
| 2,519,236 | A | * | 8/1950  | Lyman ....................... 43/42.36 |
| 2,588,055 | A | * | 3/1952  | Smith ......................... 43/42.11 |
| 2,588,720 | A | * | 3/1952  | Heiland ...................... 43/42.5 |
| 2,598,012 | A | * | 5/1952  | Prieur ....................... 43/42.47 |
| 2,618,093 | A | * | 11/1952 | Isaac ......................... 43/42.48 |
| 2,674,060 | A | * | 4/1954  | Simmons ................... 43/42.15 |
| 2,683,323 | A | * | 7/1954  | Dudley ...................... 43/42.46 |
| 2,734,301 | A | * | 2/1956  | Fuqua ....................... 43/42.49 |
| 2,753,650 | A | * | 7/1956  | Rentz et al. ............... 43/42.36 |
| 2,850,831 | A |   | 9/1958  | Parrish |
| 2,886,914 | A | * | 5/1959  | Lievense ................... 43/42.15 |
| D185,864  | S | * | 8/1959  | Kellogg ..................... 43/42.49 |
| 2,932,112 | A | * | 4/1960  | Graves, Jr. ................ 43/42.15 |
| 2,986,837 | A | * | 6/1961  | Spugios ..................... 43/42.15 |
| 3,054,209 | A | * | 9/1962  | Wiley, Jr. .................. 43/42.24 |
| 3,082,562 | A | * | 3/1963  | Duncan ..................... 43/42.15 |
| 3,139,693 | A | * | 7/1964  | Newman ................... 43/42.49 |

(Continued)

FOREIGN PATENT DOCUMENTS

CA        2092070 A1  *  9/1994

(Continued)

OTHER PUBLICATIONS

Charlie Allen, Sport Tech News, *New Lure's Catch Rate May be too High for Some Tournaments*, 2004.

(Continued)

*Primary Examiner*—Darren W. Ark
(74) *Attorney, Agent, or Firm*—Kinney & Lange, P.A.

(57) ABSTRACT

A fishing lure system comprising a hard-body lure that exhibits lateral motion when pulled through water, a trailing lure, and a flexible linkage for translating the lateral motion of the hard-body lure to lateral motion of the trailing lure, the flexible linkage having a first end connected to the hard-body lure, and second end connected to the trailing lure.

16 Claims, 5 Drawing Sheets

U.S. PATENT DOCUMENTS

| | | | |
|---|---|---|---|
| 3,158,953 A * | 12/1964 | Filler | 43/42.36 |
| 3,221,434 A * | 12/1965 | Moore | 43/42.36 |
| 3,226,874 A | 1/1966 | Boyd | |
| 3,241,261 A * | 3/1966 | Ament | 43/42.15 |
| 3,364,614 A * | 1/1968 | Huebotter | 43/43.15 |
| 3,393,465 A * | 7/1968 | Powell | 43/42.48 |
| 3,429,066 A | 2/1969 | McClellan | |
| 3,535,814 A * | 10/1970 | O'Brien | 43/42.15 |
| 3,688,434 A * | 9/1972 | Le Vau | 43/42.49 |
| 3,740,891 A * | 6/1973 | Rubenstein | 43/42.15 |
| 3,751,842 A * | 8/1973 | Smith | 43/42.11 |
| 3,757,450 A * | 9/1973 | Martinez et al. | 43/42.15 |
| D228,551 S * | 10/1973 | Harris | 43/42.15 |
| 3,831,307 A * | 8/1974 | Pittman | 43/42.24 |
| 3,848,354 A * | 11/1974 | Austad et al | 43/42.49 |
| 3,942,281 A * | 3/1976 | Hill | 43/42.15 |
| 3,956,847 A * | 5/1976 | Bayes | 43/42.45 |
| 4,035,945 A * | 7/1977 | Newman | 43/42.15 |
| 4,138,791 A * | 2/1979 | Anson | 43/42.15 |
| 4,188,743 A * | 2/1980 | Nothdurft | 43/42.15 |
| 4,215,507 A * | 8/1980 | Russell | 43/42.47 |
| 4,231,179 A * | 11/1980 | Hillesland | 43/43.15 |
| 4,236,342 A | 12/1980 | Saia | |
| 4,414,772 A * | 11/1983 | Duncan | 43/42.36 |
| 4,477,994 A * | 10/1984 | Erickson | 43/42.45 |
| 4,573,282 A | 3/1986 | Rowe | |
| 4,611,422 A * | 9/1986 | Hampton | 43/42.36 |
| 4,744,168 A * | 5/1988 | McClellan | 43/42.24 |
| 4,744,169 A * | 5/1988 | Nochta | 43/42.24 |
| 4,794,721 A * | 1/1989 | Rowe et al. | 43/42.15 |
| 4,819,365 A * | 4/1989 | Landuydt | 43/42.47 |
| 4,823,495 A * | 4/1989 | Camilleri | 43/42.36 |
| 4,841,605 A | 6/1989 | Schuierer | |
| 4,845,883 A * | 7/1989 | Langer | 43/42 |
| 4,891,901 A * | 1/1990 | Baker, Jr. | 43/42.11 |
| 4,893,430 A * | 1/1990 | Barfield | 43/42.24 |
| 4,930,246 A | 6/1990 | Cunningham | |
| 5,040,325 A * | 8/1991 | Herrmann | 43/42.36 |
| 5,088,226 A * | 2/1992 | Bazinet | 43/42.47 |
| 5,090,151 A * | 2/1992 | Salminen | 43/42.36 |
| 5,094,026 A | 3/1992 | Correll et al. | |
| 5,117,574 A * | 6/1992 | Perry | 43/42.36 |
| 5,119,581 A * | 6/1992 | Rudolph | 43/42.22 |
| 5,119,582 A | 6/1992 | Dahl | |
| 5,142,811 A | 9/1992 | Freeman | |
| 5,150,538 A * | 9/1992 | Buchanan | 43/42.45 |
| 5,155,948 A | 10/1992 | Kitagawa | |
| 5,167,089 A | 12/1992 | Schriefer | |
| 5,207,016 A | 5/1993 | Pate | |
| 5,216,830 A | 6/1993 | Brott, II | |
| 5,299,378 A * | 4/1994 | Ballard | 43/42.15 |
| 5,301,452 A | 4/1994 | Roach | |
| 5,379,543 A * | 1/1995 | Avent | 43/42.15 |
| 5,406,738 A | 4/1995 | Holleman, Sr. | |
| 5,522,170 A * | 6/1996 | Cole | 43/42.11 |
| 5,560,141 A * | 10/1996 | Hodgin | 43/42.15 |
| 5,630,289 A | 5/1997 | Dotson | |
| 5,678,351 A * | 10/1997 | Halterman, Jr. | 43/43.15 |
| 5,822,913 A | 10/1998 | Lau | |
| 5,826,367 A * | 10/1998 | Murphy | 43/42.24 |
| 5,911,571 A * | 6/1999 | Wittbrot, III | 43/42.15 |
| 5,937,569 A | 8/1999 | Solheim et al. | |
| 5,950,345 A * | 9/1999 | Kilander | 43/42.24 |
| 5,950,348 A | 9/1999 | Gruel | |
| 5,992,083 A * | 11/1999 | Deng et al. | 43/42.15 |
| 6,041,540 A * | 3/2000 | Potts | 43/42.24 |
| 6,050,018 A * | 4/2000 | Allen | 43/43.15 |
| 6,182,390 B1* | 2/2001 | Watkins | 43/42.11 |
| 6,185,857 B1 * | 2/2001 | Hnizdor | 43/42.11 |
| 6,192,618 B1* | 2/2001 | Wackerman | 43/42.15 |
| 6,237,276 B1* | 5/2001 | Storelli | 43/43.15 |
| 6,546,663 B1 | 4/2003 | Signitzer et al. | |
| 6,598,336 B1 | 7/2003 | Link | |
| 6,675,525 B1* | 1/2004 | Ford | 43/42.24 |
| 6,912,808 B1* | 7/2005 | Mak | 43/42.15 |
| 6,955,005 B1 * | 10/2005 | Storelli | 43/43.15 |
| 2002/0104251 A1* | 8/2002 | Prescott | 43/42.48 |
| 2003/0145507 A1 | 8/2003 | Claveric, III et al. | |
| 2003/0233783 A1* | 12/2003 | Storelli | 43/43.15 |

FOREIGN PATENT DOCUMENTS

| | | | |
|---|---|---|---|
| DE | 4012717 A1 * | 10/1991 | |
| FI | 24724 A * | 6/1951 | |
| JP | 2001-103872 A * | 4/2001 | |
| JP | 2002-112684 A * | 4/2002 | |
| JP | 2004-49125 A * | 2/2004 | |
| SE | 90372 A * | 9/1937 | |
| WO | WO-99/33338 A1 * | 7/1999 | |
| WO | WO-02/19815 A1 * | 3/2002 | |

OTHER PUBLICATIONS

Cabela's, *Real Image Plus*, Spring Master Catalogue 2005, p. 38.

* cited by examiner

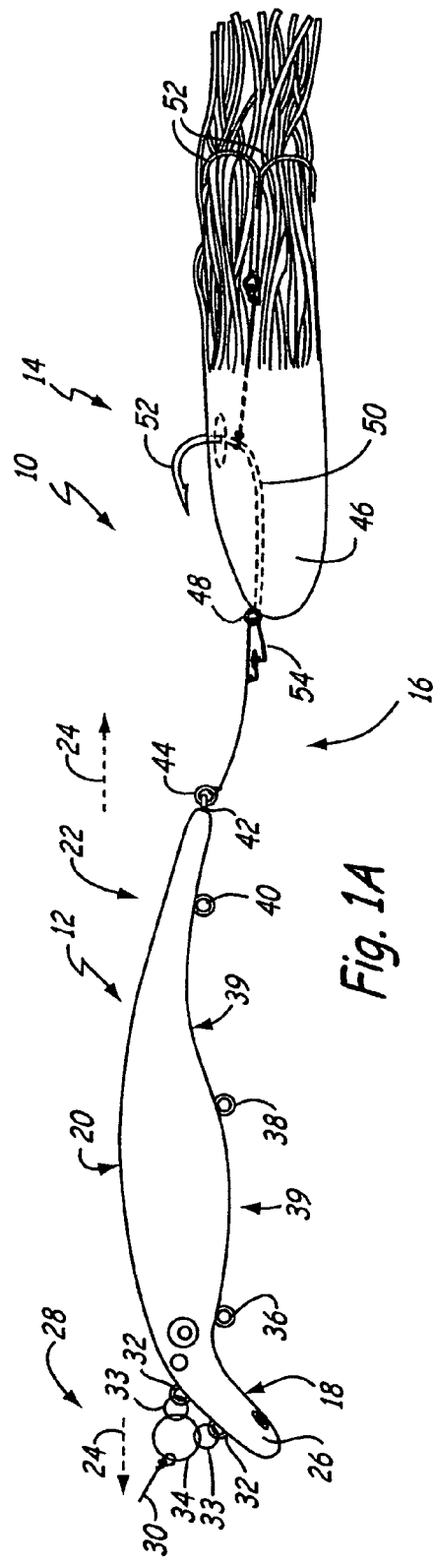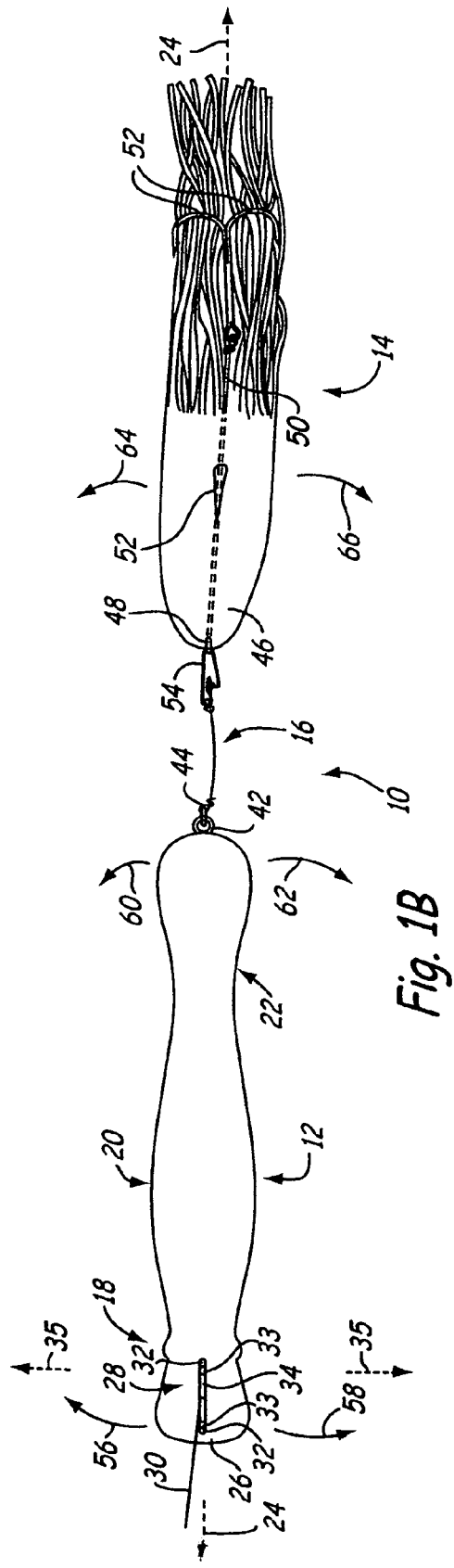

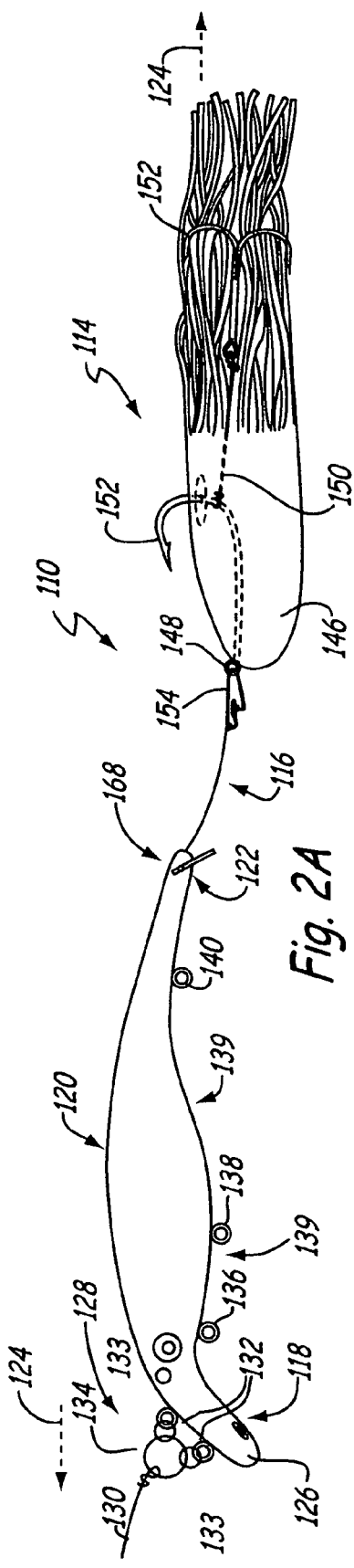
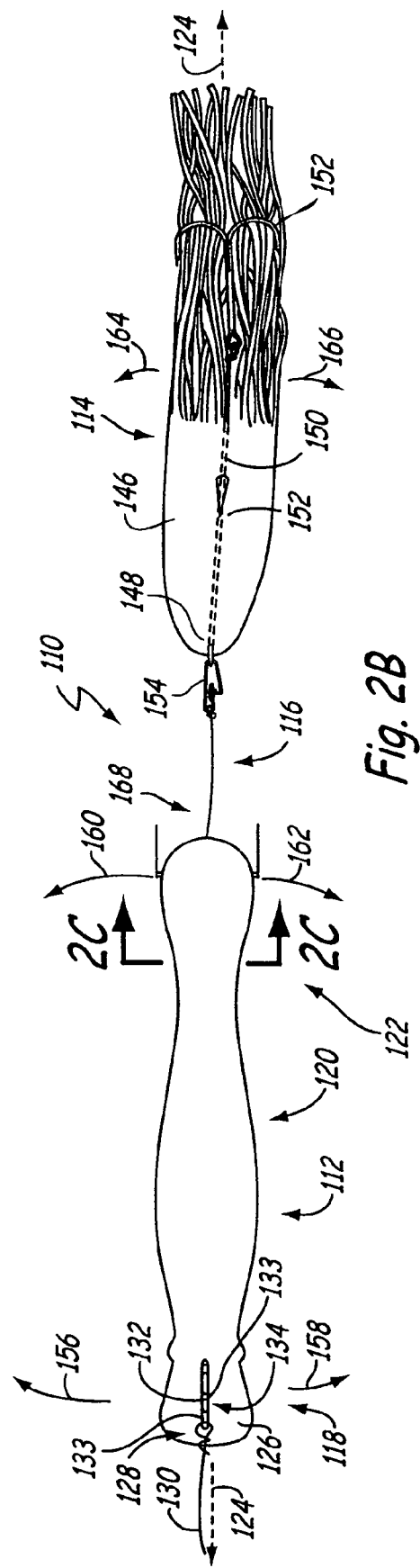

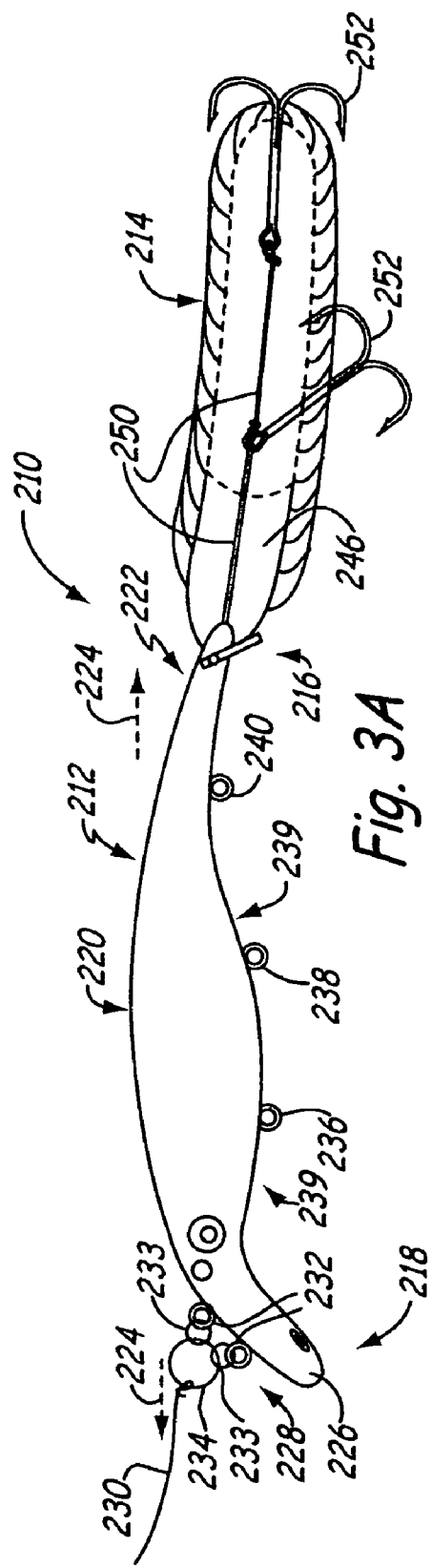
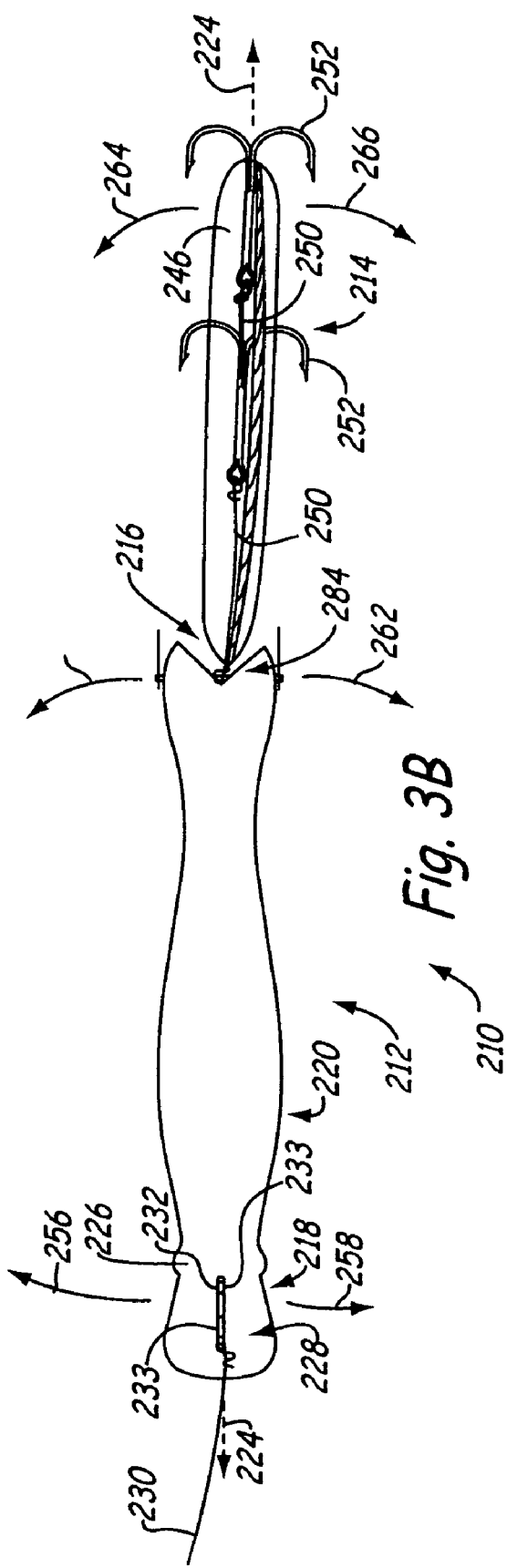
Fig. 3A
Fig. 3B

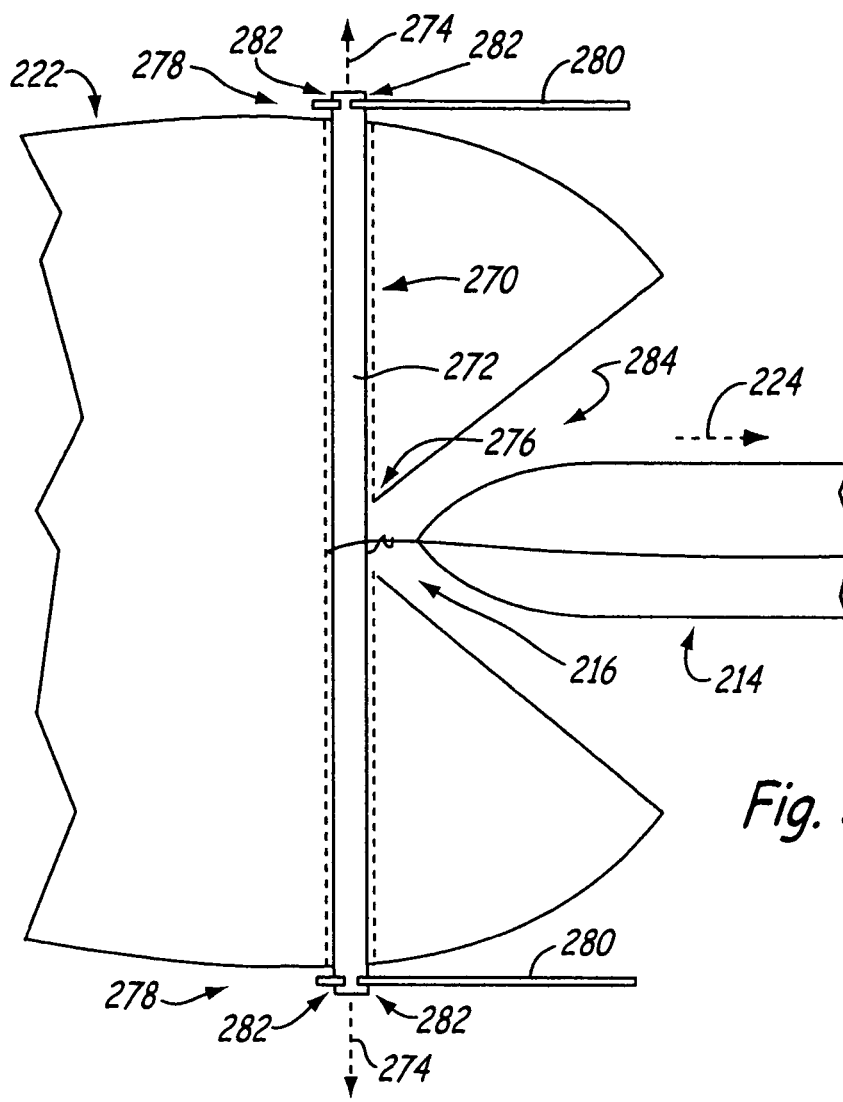
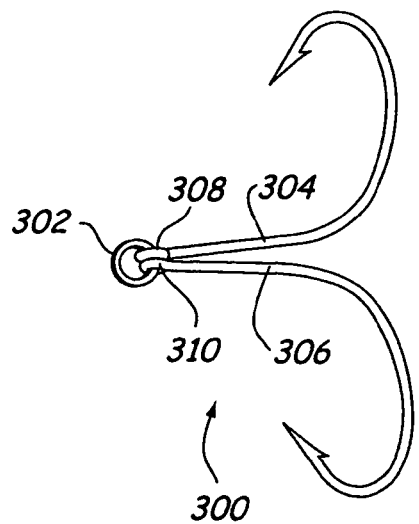
Fig. 3C
Fig. 4

FISHING LURE SYSTEM

BACKGROUND OF THE INVENTION

The present invention relates to fishing lures. More particularly, the present invention relates to a two-component fishing lure system capable of translating lateral motion of a first component to the second component.

A wide variety of artificial fishing lures are used to attract fish, thereby hooking fish that strike the lures. One type of lure is a plug, which is a hard-body lure designed to resemble baitfish and other aquatic prey, and mimic movements of fleeing prey to increase the attraction of fish. Generally, plugs may be cast and retrieved, and may be trolled (i.e., pulled through the water) at mild speeds.

Plugs are generally divided into three categories. The first category are surface plugs, which float on the surface of the water. Surface plugs create disturbances in the surface when twitched or retrieved to attract fish that feed near the surface. The second category are crankbait or diving plugs, which float when stationary and dive when retrieved. A crankbait includes a lip at the front portion of the lure that causes the crankbait to dive. The rate of descent is generally a function of the length of the lip. Additionally, the lip also causes lateral motion in the crankbait, also referred to as wobbling. When the crankbait is pulled through the water, the lateral motion attracts fish, which believe the crankbait is a fleeing or wounded prey. The third category of plugs are sinking plugs, which sink when stationary and ascend through the water when retrieved. Sinking plugs also exhibit lateral motion when pulled through the water while ascending.

The lateral motion created by the crankbait and sinking plugs are caused by the connection of the leader line to the lure at the lip. This causes the lure to wobble to attract fish. However, the lateral motion of the crankbait or sinking plug is limited to the lure itself, which limits the amount of attraction to fish.

BRIEF SUMMARY OF THE INVENTION

The present invention relates to a fishing lure system that includes a hard-body lure that exhibits lateral motion when pulled through water, a trailing lure, and a flexible linkage for translating the lateral motion of the hard-body lure to lateral motion of the trailing lure, the flexible linkage having a first end connected to the hard-body lure, and second end connected to the trailing lure.

The present invention further relates to a fishing lure system that includes a hard-body lure having a first end and a second end along a longitudinal axis, a flexible linkage having a first end and a second end, and a trailing lure. The second end of the hard-body lure includes a channel extending within the hard-body lure, a cross-channel extending through the hard-body lure in a direction substantially perpendicular to the conduit, where the channel intersects the cross-channel, and a pin disposed within the cross-channel. The first end of the flexible linkage extends through the channel and engages the pin, and the trailing lure is connected to the second end of the flexible linkage.

The present invention further relates to a fishing lure system that includes a crankbait that exhibits lateral motion when pulled through water, a soft-body plastic lure, and a flexible linkage for translating the lateral motion of the crankbait to lateral motion of the soft-body plastic lure, where the flexible linkage has a first end connected to the crankbait, and second end connected to the soft-body plastic lure.

BRIEF DESCRIPTION OF THE DRAWINGS

FIG. 1A is a side view of a first embodiment of the present invention.

FIG. 1B is a top view of a first embodiment of the present invention.

FIG. 2A is a side view of a second embodiment of the present invention.

FIG. 2B is a top view of a second embodiment of the present invention.

FIG. 3A is a side view of a third embodiment of the present invention.

FIG. 3B is a top view of a third embodiment of the present invention.

FIG. 3C is a sectional view of section 3C—3C in FIG. 3B.

FIG. 4 is a perspective view of an alternative hook suitable for use with the present invention.

DETAILED DESCRIPTION

Figure 2C:
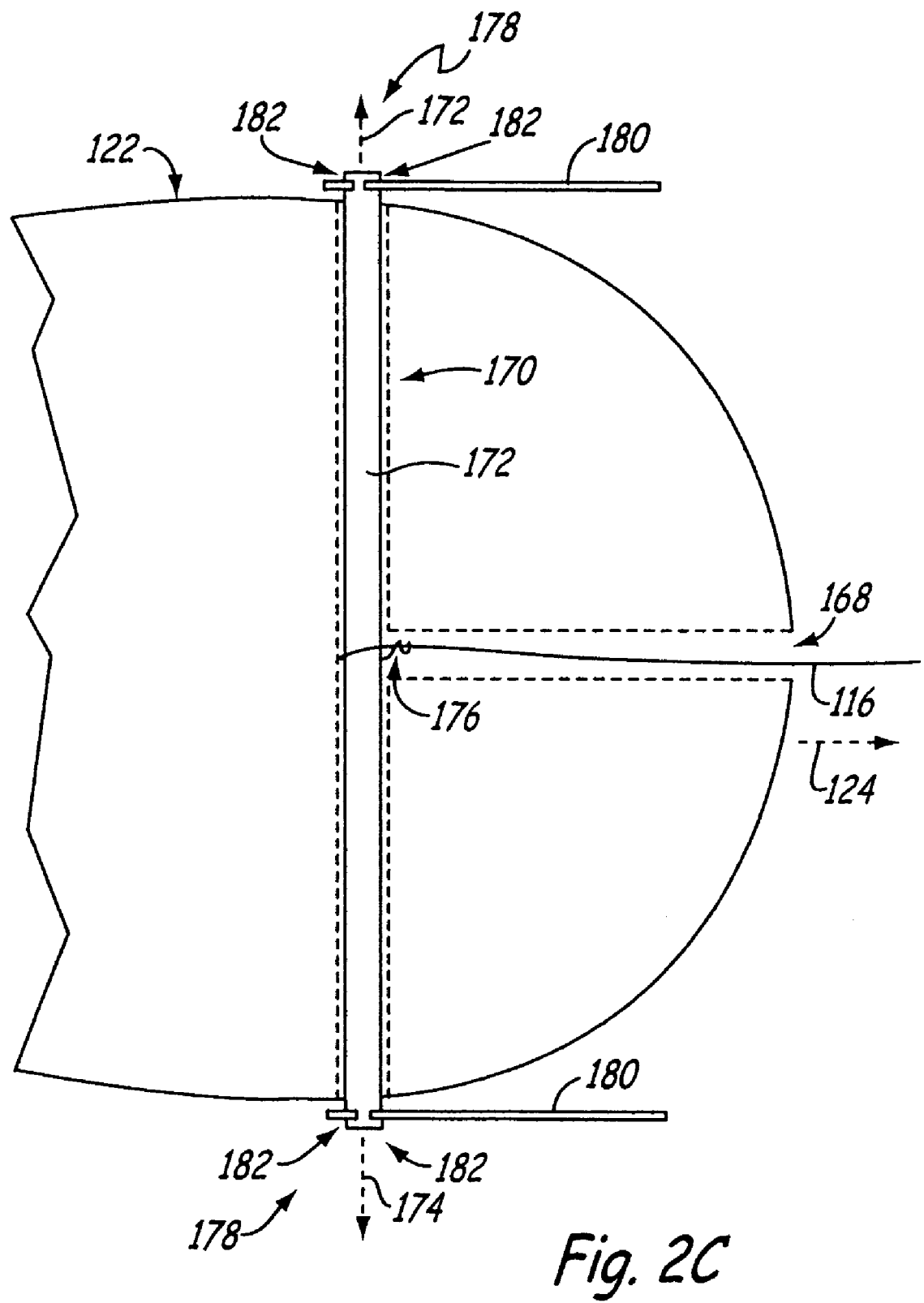
FIG. 2C is a sectional view of section 2C—2C in FIG. 2B.

FIGS. 1A and 1B are a side view and a top view of a fishing lure system 10, which exhibits a first embodiment of the present invention. The fishing lure system 10 is an artificial fishing lure system that exhibits increased lateral motion during use to enhance the attraction of fish. The fishing lure system 10 includes a hard-body lure 12, a trailing lure 14 (transparently in FIGS. 1A and 1B), and a flexible linkage 16 that connects the trailing lure 14 to the hard-body lure 12. The flexible linkage 16 also translates lateral motion of the hard-body lure 12 to the trailing lure 14, which allows the trailing lure 14 to follow the hard-body lure 12 in a sinuous or snake-like manner. This enhances the attraction of fish.

The hard-body lure 12 may be a variety of lures capable of exhibiting lateral motion, such as wobbling. Examples of suitable lures for the hard-body lure 12 include plugs such as crankbait and sinking plugs. Such lures are typically designed to resemble prey fish to increase the attraction of fish. An example of a particularly suitable lure for the hard-body lure 12 includes a crankbait, as depicted in FIGS. 1A and 1B.

The hard-body lure 12 includes a nose 18, a body 20, and a tail 22 generally along a longitudinal axis 24. The dimensions of the hard-body lure 12 may vary as individual needs may require. Examples of suitable dimensions of the hard-body lure 12 include dimensions of conventional plugs, such as the dimensions of a conventional crankbait.

The hard-body lure may be derived from a variety of materials, such as metal, wood, plastic, and combinations thereof. In the embodiments of the present invention where the hard-body lure 12 is a crankbait, the hard-body lure 12 is preferably buoyant, which allows the hard-body lure 12 to ascend in water while resting. Buoyancy also increases the lateral motion that the hard-body lure 12 exhibits while being pulled through the water. Where the hard-body lure 12 derived from metal or plastic, the hard-body lure 12 may include an air cavity within the body 20 to retain buoyancy despite the heavier materials used. Alternatively, where the hard-body lure 12 is derived from wood, the hard-body lure 12 is generally buoyant by nature of the wood, but may also include an air cavity if additional buoyancy is desired.

The nose 18 includes a lip 26 and a leader line connection 28. Because the hard-body lure 12 is depicted as a crankbait, the lip 26 extends at a downward angle from the longitudinal axis 24. This provides the diving action typically exhibited by crankbait when pulled through the water. In general, the length of the lip 26 dictates how deep the fishing lure system 10 will dive.

The leader line connection 28 depicts a particularly suitable arrangement of an eyelet connection to a leader line 30. The leader line connection 28 includes a pair of eyelets 32, a pair of small rings 33 looped through the pair of eyelets 32, and a larger ring 34 looped through the pair of small rings 33. The leader line 30 is correspondingly connected to the ring 34 in a conventional manner. Alternatively, the leader line 30 may connect directly to either of the pair of eyelets 32 in a conventional manner. However, the leader line connection 28, as depicted in FIGS. 1A and 1B, increases flexibility in the connection between the hard-body lure 12 and the leader line 30. This allows the hard-body-lure 12 to exhibit a greater level of lateral motion (e.g., wobbling).

In an alternative embodiment, the leader line connection 28 may be oriented orthogonal to the leader line connection 28 shown in FIGS. 1A and 1B. As such, the pair of eyelets 32 of the leader line connection 28 are disposed on the nose 18 along a lateral axis 35, which is perpendicular to the longitudinal axis 24. This arrangement of the leader line connection 28 allows the hard-body lure to exhibit vertical motion in addition to lateral motion, where vertical motion is motion in a plane generally parallel to FIG. 1. Correspondingly, the flexible linkage 16 may also translate vertical motion of the hard-body lure 12 to the trailing lure 14 in addition to lateral motion.

The body 20 of the hard-body lure 12 may exhibit a wide variety of lengths and widths, where the length is taken along the longitudinal axis 24 and the width is perpendicular to the longitudinal axis 24 as viewed in FIG. 1B. Generally, wider widths of the body 20 produce wider lateral motions of the hard-body lure 12 and narrower widths of the body 20 produce tighter lateral motions of the hard-body lure 12. As depicted in FIG. 1A, the body 20 includes hook hangers 36, 38 disposed along a lower surface 39 of the hard-body lure 12. The hook hangers 36, 38 are conventional hook hangers suitable for connecting hooks (not shown). Alternatively, as discussed below, the hook hangers 36, 38 are suitable connection points for the flexible linkage 16.

The tail 22 extends from the body 20 in a direction opposite of the nose 18, and includes hook hangers 40, 42. The hook hanger 40 is disposed along the lower surface 39 at the tail 22 and is similar to the hook hangers 36, 38. While the hard-body lure 12 in FIG. 1A is depicted with three hook hangers disposed along the lower surface 39, the hard-body lure 12 may alternatively be free of hook hangers disposed along the lower surface 39, or may have a greater number of hook hangers disposed along the lower surface 39, as individual needs may require. In contrast to the hook hangers 36, 38, 40, the hook hanger 42 extends from a tip of the tail 22 rather than being disposed along the lower surface 39.

The hook hangers 36, 38, 40, 42 provide connection points for the flexible linkage 16. As shown, the flexible linkage 16 is connected to the hook hanger 42. Alternatively, the flexible linkage 16 may be connected to the hook hangers 36, 38, or 40. However, the hook hangers located at the rear of the hard-body lure 12 (i.e., at the tail 22), provide for greater lateral motion of the trailing lure 14 and the flexible linkage 16. Accordingly, the hook hanger 42 is the preferred connection point for connecting the flexible linkage 16.

The flexible linkage 16 provides a connection between the hard-body lure 12 and the trailing lure 14, which is flexible for translating lateral motion of the hard-body lure 12 to the trailing lure 14. Examples of suitable linkages for the flexible linkage 16 include fishing line such as monofilament line, copolymer line, fluorocarbon line, braided line, trolling line, fly line; wires; chains; and bead chains. The length of the flexible linkage 16 may vary as individual needs may require, and may depend on the sizes of the hard-body lure 12 and the trailing lure 14. Examples of suitable lengths of the flexible linkage 16 range from about one inch to about twenty inches, with particularly suitable lengths ranging from about one inch to about five inches.

The flexible linkage 16 may be connected to one of the hook hangers 36, 38, 40, 42 in a variety of manners, such as with the techniques disclosed in *Practical Fishing Knots*, Kreh, L., Nick Lyons Books, New York, N.Y., 1972, which is incorporated herein by reference in its entirety. One suitable manner includes tying the flexible linkage 16 to a ring (e.g., a ring 44), which correspondingly is looped through one of the hook hangers 36, 38, 40, 42. Alternatively, the flexible linkage 16 may be tied to a swivel (not shown) that is correspondingly connected to one of the hook hangers 36, 38, 40, 42. This increases the flexibility of the flexible linkage 16, thereby increasing the amount of lateral motion translated from the hard-body lure 12 to the trailing lure 14.

The trailing lure 14 is connected to an opposite end of the flexible linkage 16 from the hard-body lure 12. The trailing lure 14 may be a variety of lures that are capable of exhibiting lateral motion that is provided by the hard-body lure 12 via the flexible connection 16. Examples of suitable lures for the trailing lure 14 include soft-body plastic lures, spoons, flies, jigs, and spinners. Examples of particularly suitable lures include soft-body plastic lures, such as squids (as depicted in FIGS. 1A and 1B), worms, leaches, lizards, spider grubs, craws, tubes, shrimp, and shad, all of which are flexible and are readily capable of exhibiting lateral motion.

As shown, the trailing lure 14 includes a body 46, and eyelet 48, a line 50, and hooks 52. The body 46 is made from a soft plastic, such as rubber, which is flexible and capable of exhibiting lateral motion. The line 50 and the hooks 52 are optional components to increase the likelihood of catching fish that strike the fishing lure system 10. The eyelet 48 provides a connection point for the flexible connection 16. The trailing lure 14 may be connected to the flexible connection 16 in conventional manners. For example, as depicted in FIGS. 1A and 1B, the trailing lure 14 may further include a snap 54 that is connected to the eyelet 48. The flexible connection 16 may then be connected to the snap 54 in a conventional manner.

The trailing lure 14 may also include buoyancy modifiers (not shown), such as closed-cell foam blocks or air cavities attached to the trailing lure 14. The buoyancy modifiers are useful to achieve neutral buoyancy in the trailing lure 14.

As the hard-body lure 12 is pulled through the water via the leader line 30, the hard-body lure 12 exhibits lateral motion, noted by arrows 56, 58, 60, 62. Generally, the hard-body lure 12 oscillates laterally (e.g., wobbles) such that the nose 18 moves in the direction of the arrow 56 simultaneously with the tail 22 moving in the direction of the arrow 62, and the nose 18 moves in the direction of the arrow 58 simultaneously with the tail 22 moving in the direction of the arrow 60. The lateral motion is generally centered around a pivot point located along the body 20. As the hard-body lure 12 moves laterally, the flexible linkage 16 is pulled along with the hard-body lure 12.

The flexible linkage 16 translates a level of lateral motion that depends on which of the hook hangers 36, 38, 40, 42 the flexible linkage 16 is connected to. The hard-body lure 12 provides the greatest amount of lateral motion at the tail 22. Accordingly, the flexible linkage 16 translates the greatest amount lateral motion when connected to the hook hanger 42. As the tail 22 oscillates in the directions of the arrows 60, 62, the flexible linkage 16 is pulled with the tail 22. This creates a sinuous lateral motion in the flexible linkage 16. The sinuous lateral motion of the flexible linkage 16 is translated to the trailing lure 14, which thereby exhibits the lateral motion as well (depicted by arrows 64, 66). This effectively creates a system that moves in a sinuous path dictated by the amount of wobbling exhibited by the hard-body lure 12. The lateral motion provided by the fishing lure system 10 disturbs the water to a greater extent than a plug operated alone. This correspondingly increases the attraction of fish.

Additionally, because the hard-body lure 12 and the trailing lure 14 are separate components, a fish striking the fishing lure assembly 10 may only strike the trailing lure 14. This reduces potential damage that the hard-body lure 12 may otherwise endure during a fish strike.

FIGS. 2A and 2B are a side view and a top view of a fishing lure system 110, which exhibits a second embodiment of the present invention. Components of the fishing lure system 110 that correspond to the components of the fishing lure system 10 are likewise numbered by adding "100" to the reference. The fishing lure system 110 includes a hard-body lure 112, a trailing lure 114, and a flexible linkage 116 that connects the trailing lure 114 to the hard-body lure 112.

The flexible linkage 116 translates lateral motion of the hard-body lure 112 to the trailing lure 114 in a similar manner as described for the fishing lure system 10 in FIGS. 1A and 1B. This allows the trailing lure 114 to follow the hard-body lure 112 in a sinuous or snake-like manner, which enhances the attraction of fish.

The fishing lure system 110 provides an alternative means for connecting the flexible connection 116 to the hard-body lure 112. The flexible linkage 116 is removably connected to the hard-body lure within the tail 122 rather than via one of the hook hangers (e.g., the hook hangers 136, 138, 140). This precludes the need for a hook hanger that corresponds to the hook hanger 42 in the first embodiment of the present invention. The flexible linkage 116 extends within the tail 122 at a channel 168 in the tail 122. This allows the flexible linkage 116 to translate the lateral motion of the tail 122 to the trailing lure 114.

As the hard-body lure 112 is pulled through the water via the leader line 130, the hard-body lure 112 exhibits lateral motion, noted by arrows 156, 158, 160, 162. As discussed above, the hard-body lure 112 generally exhibits a lateral motion such that the nose 118 moves in the direction of the arrow 156 simultaneously with the tail 122 moving in the direction of the arrow 162, and the nose 118 moves in the direction of the arrow 158 simultaneously with the tail 122 moving in the direction of the arrow 160. The lateral motion is generally centered around a pivot point located along the body 120. As the hard-body lure 112 moves laterally, the flexible linkage 116 is pulled along with the hard-body lure 112.

As the tail 122 oscillates in the directions of the arrows 160, 162, the flexible linkage 116 is pulled with the tail 122. This creates a sinuous lateral motion in the flexible linkage 116. The sinuous lateral motion of the flexible linkage 116 is translated to the trailing lure 114, which thereby exhibits the lateral motion as well (depicted by arrows 164, 166). This effectively creates a system that moves in a sinuous path dictated by the amount of wobbling exhibited by the hard-body lure 112. The lateral motion provided by the fishing lure system 110 disturbs the water to a greater extent than a plug operated alone, which increases the attraction of fish.

FIG. 2C is a sectional view of section 2C—2C in FIG. 2B, which illustrates the connection between the tail 122 of the hard-body lure 112 and the flexible linkage 116. The tail 122 includes the channel 168, and further includes a cross-channel 170 and a rod 172. The channel 168 extends from the rear tip of the tail 122 and is preferably parallel to the longitudinal axis 124. The dimensions of the channel 168 may vary depending on the dimensions of the hard-body lure 112, and may be formed in the tail 122 with conventional techniques, such as drilling.

The cross-channel 170 extends along the tail 122 in a direction parallel to a lateral axis 174, where the lateral axis 174 is perpendicular to the longitudinal axis 124 in FIG. 2C. The cross-channel 170 connects with the channel 168 at an intersection 176. The dimensions of the cross-channel 170 may also vary depending on the dimensions of the hard-body lure 112. The cross-channel 170 preferably extends through the tail 122 and exhibits a similar diameter to the channel 168. The cross-channel 168 may also be formed in the tail 122 with conventional techniques, such as drilling.

The rod 172 extends through the cross-channel 170 and provides a connection point for the flexible linkage 116. The rod 172 may be derived from a variety of materials capable of supporting the weight of the trailing lure 114 and the flexible linkage 116. Examples of suitable materials include metal and plastic. Preferably, the rod 172 is an oxidation and corrosion-resistant steel rod. The rod 172 preferably exhibits a diameter less than the diameter of the cross-channel 170, which allows the rod 172 to be readily inserted and removed when required. The rod 172 also preferably exhibits a length in the direction of the lateral axis that is greater than the length of the cross-channel 170. This allows the rod 172 to be anchored on each lateral side 178 of the tail 122.

The rod 172 may be anchored to each lateral side 178 in a variety of manners that allow the rod 172 to be removably secured in the cross-channel 170. For example, as shown in FIG. 2C, the rod 172 is anchored with a hitch pin 180 on each lateral side 178. The rod 172 includes notches 182 radially machined into the rod 172 each end. The hitch pins 180 are then inserted through the notches 182 at each lateral side 178 to retain the rod 172 in the cross-channel 170 during use.

Alternatively, the rod 172 may exhibit a length that is shorter than the length of the cross-channel 170. The rod 172 may then be anchored by a stopper material, such as putty, solder, clay, or a curable plastic. This secures the rod 172 within the cross-channel 170. However, the stopper material generally prevents the rod 172 form being subsequently removed from the cross-channel 172.

The second embodiment of the present invention provides for the flexible linkage 116 to be removable from the hard-body lure 112 for substituting different trailing lures 114. To connect the trailing lure 114 and the flexible linkage 116 to the hard-body lure 112, the flexible linkage 114 is tied into a loop and inserted into the channel 168 so that the loop extends through the cross-channel 170 at the intersection 176. The rod 172 is then inserted into the cross-channel 170 and through the loop. The rod 172 is then anchored at the lateral sides 178 to prevent the rod 172 from sliding out of the cross-channel 170. The flexible linkage 116 is then securely connected to the tail 122, which allows the flexible linkage 116 (and the trailing lure 114) to follow the lateral motion of the hard-body lure 112.

FIGS. 3A and 3B are a side view and a top view of a fishing lure system 210, which exhibits a third embodiment of the present invention. Components of the fishing lure system 210 that correspond to the components of the fishing lure system 10 are likewise numbered by adding "200" to the reference. The fishing lure system 210 includes a hard-body lure 212, a trailing lure 214, and a flexible linkage 216 that connects the trailing lure 214 to the hard-body lure 212.

The flexible linkage 216 translates lateral motion of the hard-body lure 212 to the trailing lure 214 in a similar manner as described for the fishing lure system 10 in FIGS. 1A and 1B. This allows the trailing lure 114 to follow the hard-body lure 212 in a sinuous or snake-like manner, which enhances the attraction of fish. As shown, the flexible linkage 216 has a short length relative to the flexible linkages 16, 116, described above. The shorter length of the flexible linkage 216 reduces the distance between the hard-body lure 212 and the trailing lure 214. This reduces the delay in the lateral motion translated to the trailing lure 214, and is particularly suitable where the trailing lure 214 is a tail-shaped lure, as depicted in FIGS. 3A and 3B. This effectively provides a flexible tail that extends from the hard-body lure 212 and exhibits a greater level of lateral motion compared to conventional flexible tails that are directly attached to hard-body lures.

The fishing lure system 210 provides an additional means for connecting the flexible connection 216 to the hard-body lure 212, and is particularly suitable when the flexible linkage 216 exhibits a short length. The flexible linkage 216 is removably connected to the hard-body lure within the tail 222 in a similar manner to the system described above for the fishing lure system 110 in FIGS. 3A–3C. However, in lieu of the channel 168, the hard-body lure 212 includes an indentation 284, which is an alternative channel cut out of the tail 222. The flexible linkage 216 extends within the indentation 284 and connects to the hard-body lure 212 within the tail 222. This allows the flexible linkage 216 to translate the lateral motion of the hard-body lure 212 to the trailing lure 214. As shown in FIG. 3B, a portion of the trailing lure 214 also extends within the indentation 284.

As the hard-body lure 112 is pulled through the water via the leader line 230, the hard-body lure 212 exhibits lateral motion, noted by arrows 256, 258, 260, 262. The hard-body lure 212 generally exhibits a lateral motion such that the nose 218 moves in the direction of the arrow 256 simultaneously with the tail 222 moving in the direction of the arrow 262, and the nose 218 moves in the direction of the arrow 258 simultaneously with the tail 222 moving in the direction of the arrow 260. The lateral motion is generally centered around a pivot point located along the body 220. As the hard-body lure 212 moves laterally, the flexible linkage 216 is pulled along with the hard-body lure 212.

As the tail 222 oscillates in the directions of the arrows 260, 262, the flexible linkage 216 is pulled with the tail 222. This creates a sinuous lateral motion in the flexible linkage 216. The sinuous lateral motion of the flexible linkage 216 is translated to the trailing lure 214, which thereby exhibits the lateral motion as well (depicted by arrows 264, 266). Because the flexible linkage 216 is short, the delay in the lateral motion that the trailing lure 214 exhibits is reduced. As such, the trailing lure 214 appears as a flexible tail that moves in a sinuous path dictated by the amount of wobbling the hard-body lure 212 exhibits. The lateral motion provided by the fishing lure system 210 disturbs the water to a greater extent than a plug operated alone. This correspondingly increases the attraction of fish.

FIG. 3C is a sectional view of section 3C—3C in FIG. 3B, which illustrates the connection between the tail 222 of the hard-body lure 212 and the flexible linkage 216. The tail 222 includes the indentation 284, and further includes a cross-channel 270 and a rod 272. The indentation 284 is an exposed portion of the tail 222 cut out in a conventional manner, or shaped during molding or casting of the hard-body lure 212. As shown, the indentation 284 exhibits a "V"-shape to accommodate the trailing lure 214. However, the indentation 284 may alternatively exhibit a variety of other shapes cut out of the tail 222 to accommodate different lures for the trailing lure 214 (e.g., squids, worms, and shrimp).

The cross-channel 270 and the rod 272 operate in the same manner as described above for the cross-channel 170 and the rod 172 in FIG. 2C. As shown in FIG. 3C, the cross-channel 270 connects with the indentation 284 at an intersection 276. The third embodiment of the present invention also provides for the flexible linkage 216 to be removable from the hard-body lure 212 for substituting different trailing lures 214. To connect the trailing lure 214 and the flexible linkage 216 to the hard-body lure 212, the flexible linkage 214 is tied into a loop and inserted into the indentation 284 so that the loop extends through the cross-channel 270 at the intersection 276. As shown in FIG. 3C, the trailing lure 214 then partially extends within the indentation 284.

The rod 272 is then inserted into the cross-channel 270 and through the loop. The rod 272 is then anchored at the lateral sides 278 to prevent the rod 272 from sliding out of the cross-channel 270. The flexible linkage 216 is then securely connected to the tail 222, which allows the flexible linkage 216 (and the trailing lure 214) to follow the lateral motion of the hard-body lure 212.

FIG. 4 is a perspective view of a hook 300, which is an alternative hook design that is suitable for use with the present invention. As shown, the hook 300 includes a ring 302, which is connected to a pair of offset hooks 304, 306 via eyelets 308, 310, respectively. The single hooks 304, 306 are separate and are generally oriented as mirror images to each other. This allows the offset hooks 304, 306 to individually move relative to each other, which increases the range of penetration angles. This arrangement also precludes the need for expensive soldering that is typical with treble hook manufacturing, and is lighter weight than conventional treble hooks of similar size. Alternatively, the single hooks 304, 306 may be secured to each other in a conventional manner, such as by soldering, or may be formed from a single metal hook wire.

Although the present invention has been described with reference to preferred embodiments, workers skilled in the art will recognize that changes may be made in form and detail without departing from the spirit and scope of the invention.

The invention claimed is:

1. A fishing lure system comprising:
    a hard-body lure that exhibits lateral motion when pulled through water, the hard-body lure having a nose end and a tail end along a longitudinal axis, wherein the tail end comprises:
        a channel extending within the hard-body lure;
        a cross-channel extending through the hard-body lure in a direction substantially perpendicular to the channel, wherein the channel intersects the cross-channel; and
        a pin disposed within the cross-channel; and wherein the nose end comprises:
a leader line connection for connecting to a leader line, the leader line connection comprising:
a first eyelet connected to the hard-body lure and a second eyelet connected to the hard-body lure;
a first ring looped through the first eyelet and a second ring looped through the second eyelet; and
a third ring looped through the first ring and the second ring, wherein the leader line connects to the third ring;
a trailing lure; and
a flexible linkage for translating the lateral motion of the hard-body lure to lateral motion of the trailing lure, the flexible linkage having a first end connected to the pin, and second end connected to the trailing lure.

2. The fishing lure system of claim 1, wherein the hard-body lure comprises a crankbait.

3. The fishing lure system of claim 1, wherein the trailing lure comprises a soft-bodied plastic lure.

4. The fishing lure system of claim 1, wherein the flexible linkage is selected from a group consisting of monofilament line, copolymer line, fluorocarbon line, braided line, trolling line, fly line, wires, chains, and bead chains.

5. The fishing lure system of claim 1, wherein the channel extends in a direction substantially parallel to the longitudinal axis.

6. The fishing lure system of claim 1, wherein the pin is removable from the hard-body lure.

7. The fishing lure system of claim 1, wherein the flexible linkage further translates vertical motion of the hard-body lure to vertical motion of the trailing lure.

8. A fishing lure system comprising:
a hard-body lure having a first end and a second end along a longitudinal axis, wherein the second end of the hard-body lure comprises:
a channel extending within the hard-body lure;
a cross-channel extending through the hard-body lure, wherein the channel intersects the cross-channel; and
a pin disposed within the cross-channel; and
wherein the first end of the hard-body lure comprises:
a leader line connection for connecting to a leader line, the leader line connection comprising:
a first eyelet connected to the hard-body lure and a second eyelet connected to the hard-body lure;
a first ring looped through the first eyelet and a second ring looped through the second eyelet; and
a third ring looped through the first ring and the second ring, wherein the leader line connects to the third ring;
a flexible linkage having a first end and a second end, wherein the first end of the flexible linkage extends through the channel and engages the pin; and
a trailing lure connected to the second end of the flexible linkage.

9. The fishing lure system of claim 8, wherein the channel extends in a direction substantially parallel to the longitudinal axis.

10. The fishing lure system of claim 8, wherein the pin is removable from the hard-body lure.

11. The fishing lure system of claim 8, wherein the trailing lure comprises a soft-bodied plastic lure.

12. The fishing lure system of claim 8, wherein the hard-body lure exhibits lateral motion when pulled through water, and wherein the flexible linkage translates the lateral motion of the hard-body lure to lateral motion of the trailing lure.

13. The fishing lure system of claim 8, wherein the flexible linkage further translates vertical motion of the hard-body lure to vertical motion of the trailing lure.

14. A fishing lure system comprising:
a crankbait that exhibits lateral motion when pulled through water, the crankbait having a first end and a second end along a longitudinal axis, wherein the second end comprises:
a channel extending within the crankbait,
a cross-channel extending through the crankbait in a direction substantially perpendicular to the channel, wherein the channel intersects the cross-channel, and
a pin disposed within the cross-channel; and
wherein the first end comprises:
a first eyelet connected to the crankbait and a second eyelet connected to the crankbait:
a first ring looped through the first eyelet and a second ring looped through the second eyelet; and
a third ring looped through the first ring and the second ring, wherein the leader line connects to the third ring;
a soft-body plastic lure; and
a flexible linkage for translating the lateral motion of the crankbait to lateral motion of the soft-body plastic lure, the flexible linkage having a first end that extends through the channel of the crankbait and engages the pin, and a second end connected to the soft-body plastic lure.

15. The fishing lure system of claim 14, wherein the channel extends in a direction substantially parallel to the longitudinal axis.

16. The fishing lure system of claim 14, wherein the flexible linkage further translates vertical motion of the crankbait to vertical motion of the soft-body plastic lure.

* * * * *

UNITED STATES PATENT AND TRADEMARK OFFICE
CERTIFICATE OF CORRECTION

PATENT NO. : 7,059,080 B2  Page 1 of 1
APPLICATION NO. : 10/927913
DATED : June 13, 2006
INVENTOR(S) : Bruce N. Bendel It is certified that error appears in the above-identified patent and that said Letters Patent is hereby corrected as shown below:

Title Page, item 56 References Cited, U.S. PATENT DOCUMENTS, delete "643,579", insert --643,573--

Title Page, item 56 References Cited, U.S. PATENT DOCUMENTS, delete "1,897,107", insert --1,897,109--

Title Page, item 56 References Cited, U.S. PATENT DOCUMENTS, delete "2,237,077", insert --2,234,077--

Title Page, item 56 References Cited, U.S. PATENT DOCUMENTS, delete "2,850,831", insert --2,850,834--

Signed and Sealed this

Sixth Day of March, 2007

JON W. DUDAS
*Director of the United States Patent and Trademark Office*